US005807040A

United States Patent [19]

Bongers-Ambrosius et al.

[11] Patent Number: 5,807,040

[45] Date of Patent: Sep. 15, 1998

[54] TOOL BIT CHUCK

[75] Inventors: Hans-Werner Bongers-Ambrosius, Iffeldorf; Jörg Eichhorn, München, both of Germany

[73] Assignee: Hilti Aktiengesellschaft, Schaan, Liechtenstein

[21] Appl. No.: 729,824

[22] Filed: Oct. 8, 1996

[30] Foreign Application Priority Data

Oct. 9, 1995 [DE] Germany ........................ 195 37 561.0

[51] Int. Cl.[6] .................................................. B23B 31/117

[52] U.S. Cl. ........................ 408/226; 279/19.3; 279/19.4; 279/75; 279/82; 408/239 R; 408/240

[58] Field of Search .................................... 408/226, 240, 408/239 R, 238; 279/19, 19.4, 19.3, 57, 75, 82, 86

[56] References Cited

U.S. PATENT DOCUMENTS

| | | | |
|---|---|---|---|
| 2,807,473 | 9/1957 | Kiehne | 279/82 |
| 4,377,292 | 3/1983 | Staron | 279/82 |
| 4,900,202 | 2/1990 | Wienhold | 408/240 |
| 5,013,194 | 5/1991 | Wienhold | 279/75 |
| 5,076,371 | 12/1991 | Obermeier et al. | 408/226 |
| 5,320,459 | 6/1994 | Kleine | 408/240 |
| 5,346,340 | 9/1994 | Runge | 408/226 |
| 5,398,946 | 3/1995 | Quiring | 279/75 |
| 5,427,481 | 6/1995 | Selb et al. | 408/226 |
| 5,558,478 | 9/1996 | Odendahl et al. | 279/82 |

FOREIGN PATENT DOCUMENTS

| | | |
|---|---|---|
| 0618031 | 10/1994 | European Pat. Off. . |
| 8910822 | 2/1990 | Germany . |
| 9305463 | 8/1993 | Germany . |
| 4341969 | 6/1995 | Germany . |
| 2141659 | 1/1985 | United Kingdom . |

*Primary Examiner*—Daniel W. Howell
*Assistant Examiner*—Adesh Bhargava
*Attorney, Agent, or Firm*—Anderson, Kill & Olick, P.C.

[57] ABSTRACT

A tool bit chuck for holding a bit (1) with axially extending grooves (2) closed at the ends thereof spaced apart in the axial direction. Latching elements (4) in the form of cylinders are radially displaceable into and out of the grooves (2). The latching elements (4) have an axis of rotation extending transversely of the axis of the receiving sleeve (3) in the chuck, whereby the latching elements (4) act as roll bodies in the event of an axial shift between the bit (1) and the receiving sleeve (3) so that friction which could result in premature wear, is prevented.

6 Claims, 2 Drawing Sheets

TOOL BIT CHUCK

BACKGROUND OF THE INVENTION

The present invention is directed to a tool bit chuck for receiving bits which have at least one axially extending groove with the ends of the grooves spaced apart in the axial direction being closed and wherein at least one latching element in the form of a cylindrical member is engaged in the groove and is supported in an opening in a receiving sleeve of the chuck so that it can be displaced radially.

A tool bit chuck for manually operated drilling tools is known, for instance from DE-OS26 40 767, where a bit can be inserted into the tool bit chuck having two axially closed ended grooves. In the manually operated tool disclosed above, we are mainly dealing with hammerdrills, combination hammers and chippers. These manually operated tools mainly transmit a rotary as well as a striking motion to the bit inserted into the chuck. Accordingly, the tool bit chuck must be arranged in such a way that on one hand the torque can be transmitted to the bit but on the other hand it must be assured that the bit is supported in the chuck so as to be axially displaceable, however, being prevented from dropping out of the chuck.

To satisfy the above requirements, the known tool bit chuck has two latching elements shaped as cylinders which have an orientation so that the axis of rotation of the latching elements extends parallel to the central axis of a receiving sleeve in the chuck. The latching elements are radially displaceable so that within the sleeve in an inwardly shifted position, they project into the grooves formed in the bit. Since the grooves are closed at their ends spaced apart in the axial direction, the latching elements prevent the bits from dropping out of the tool bit chuck and with appropriately long dimensions, the grooves provide the required axially displaceability of the bit. The grooves in the bit have areas which are in contact with the latching elements thus assuring transmittal of torque.

In view of the striking motion delivered by the manually operated tools to the bits, it is necessary that the bits be supported in the chuck so as to be axially displaceable to a limited extent, as has been stated above. Accordingly, a continuous axial shift occurs in operation between the bit and the tool bit chuck. Since the latching elements involved in transmitting torque are part of the receiving sleeve, a relative displacement occurs between the bit and the latching elements formed as cylinders, so that the torque still acts on the latching elements. As a result, a very high friction is developed at the contact areas between the latching elements and the bit which entails considerable wear on the latching elements as well as on the corresponding regions of the bit. Premature failure of the bits as well as a disproportionately high wear in the tool bit chuck results, particularly in the latching elements.

SUMMARY OF THE INVENTION

Therefore, it is the primary object of the present invention to provide a tool bit chuck for manually operated tools of the above mentioned type in which harmful wear on the bit as well as on the chuck can be prevented.

In accordance with the present invention, the latching elements are designed as cylinders with an axis of rotation arranged to extend transversely of and laterally outwardly from the central axis of the receiving sleeve so that the axis of rotation of the latching elements do not intersect the central axis of the receiving sleeve.

The latching element in its engaged position cooperates with the groove in the bit and in the tool bit chuck for transmitting torque as well as axial retention of the bit and this axial retention affords a limited axial displaceability. In the invention, the axis of rotation of the latching element runs transversely to the direction of displacement of the bit, a rolling motion of the latching element similar to that of a roll body ensues. Relative shifts between the bit and the latching elements entailing friction are therefore prevented and a considerable increase in the useful life of the bit and the chuck is gained.

Ideal conditions for the rolling motion of the latching elements are attained, if the axis of rotation of the latching elements extends basically perpendicularly to the central axis of the receiving sleeve.

It is advantageous for dimensioning the latching element that the length of the element is in the range of 1–3 times its diameter.

The ends of the latching elements are shaped as domes or hemispheres so that in cooperation with the bit large transmittal regions are formed. In addition, the hemisphere-like ends result in additional rolling motion and further avoidance of wear due to friction.

Preferably, at least two latching elements are used and in such case they can be disposed diametrically opposite one another.

It is also possible to provide three latching elements instead of two wherein it is then desirable to distribute the three latching elements spaced uniformly along the circumference of receiving sleeve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE INVENTION

Figure 1:
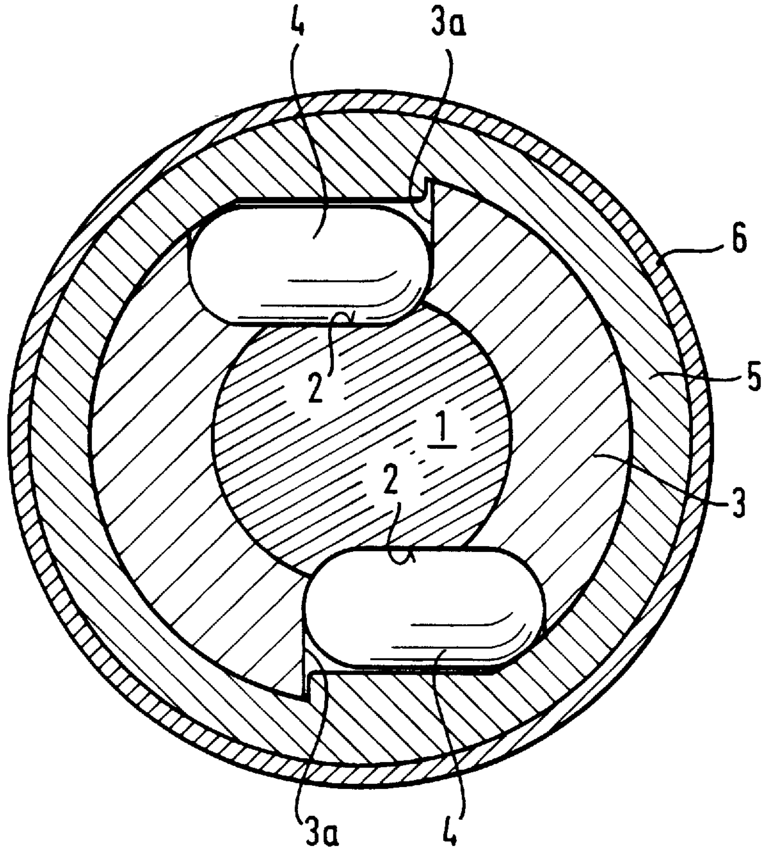
FIG. 1 is a diagrammatic transverse cross-section of a tool bit chuck embodying the present invention and with a bit inserted in the chuck.

As shown in FIG. 1, a bit 1 is inserted into the tool bit chuck with the bit having two axially extending grooves 2 located diametrically opposite one another. The opposite ends of the groove, spaced apart in the axial direction of the groove, are closed. Furthermore, the tool bit chuck has a receiving sleeve 3 with openings 3*a*. The receiving sleeve has a central axis substantially coaxial with the central axis of the chuck. Latching elements 4, in the form of cylinders, are supported within the openings 3*a* so that they can be displaced radially. Opposite ends of the latching elements extending transversely of their axial direction, are shaped either domelike or hemispherelike, as is shown. The axes of the latching elements extend transversely of the axis of the tool bit chuck. Further, the latching elements axes are spaced laterally outwardly from the chuck axis so that they do not intersect with the chuck axis.

In the illustrated inwardly displaced position, the latching elements 4 engage in the grooves 2 in the bit 1, thus the tool bit chuck can transmit torque to the bit 1 because of the closed ends of the grooves 2 and the bit 1 is axially secured as well as being axially displaceable to a limited extent due to appropriate dimensioning of the grooves 2. Accordingly, when a single latching element 4 is used the length of the groove 2 exceeds the diameter of the latching element by a specific amount corresponding to the required axial movement.

The receiving sleeve 3 in the chuck is laterally enclosed by an actuation sleeve 5 which, in turn, is surrounded by a cage 6. The actuation sleeve has recesses, not shown, which can be brought into register with the latching elements by displacing the actuation sleeve, so that the latching elements 4 can be displaced radially outwardly and the bit can be removed from the chuck.

Figure 2:
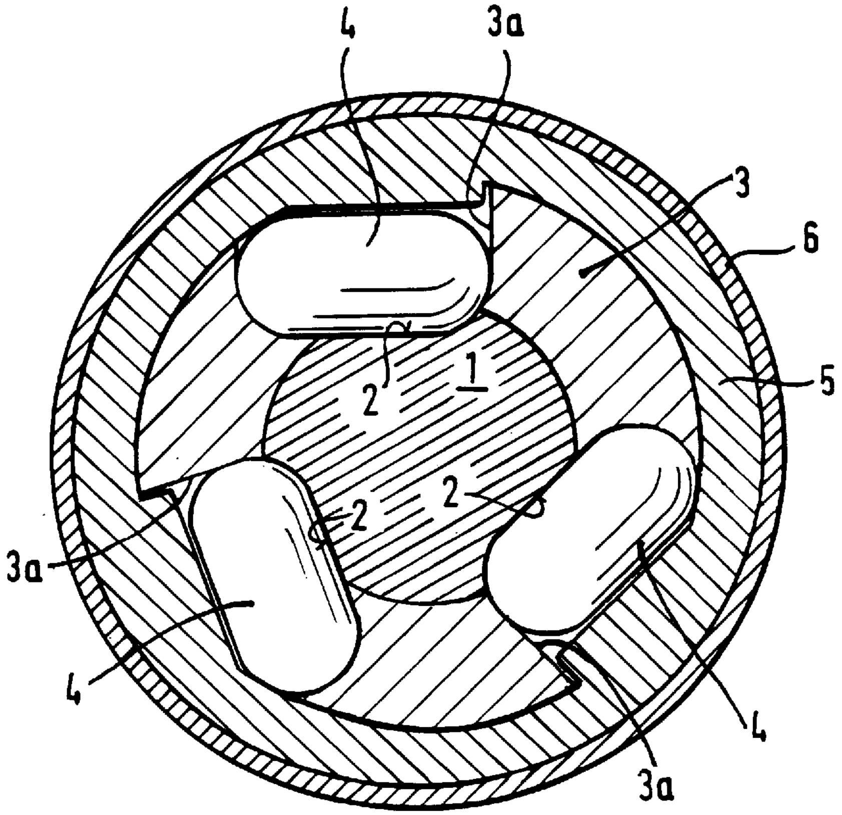
FIG. 2 is a view similar to FIG. 1 but with an additional latching element.

In FIG. 2, three latching elements 4 are used instead of the two latching elements in FIG. 1.

Instead of only one latching element 4 for the groove in the bit 2 several latching elements 4 can be used cooperating with the same groove. In such case the latching elements 4 are arranged consecutively in a direction running parallel to the principle axis of the receiving sleeve and are able to transmit higher torques. The length of the groove is sized according to the quantity of the latching elements used, in this way permitting the bit to perform an adequate axial movement.

While specific embodiments of the inventions have been shown and described in detail to illustrate the inventive principles, it will be understood that the invention may be embodied otherwise without departing from such principles.

What is claimed is:

1. A tool bit chuck having a central axis and arranged to hold an axially extending bit (1) having a trailing end insertable into the chuck, said bit having at least one axially extending groove (2) with ends thereof being closed, at least one cylindrically shaped latching element (4) engageable in said at least one groove (2), said chuck includes an axially extending receiving sleeve (3) arranged to laterally enclose said bit within said chuck and having an opening thereto for supporting said latching element (4) for radial displacement relative to said bit, said receiving sleeve having a central axis substantially coaxial with the central axis of said chuck, said latching element (4) having an axis of rotation extending transversely of the central axis of said receiving sleeve, and the central axis of said latching element (4) is spaced laterally outwardly from the central axis of said receiving sleeve so that it does not intersect the central axis of the receiving sleeve.

2. A tool bit chuck, as set forth in claim 1, wherein the axis of rotation of the latching element (4) extends perpendicularly to the central axis of said chuck.

3. A tool bit chuck, as set forth in claim 1 or 2, wherein the length of the said latching element (4) is in the range of 1 to 3 times the diameter of said latching element.

4. A tool bit chuck, as set forth in claim 3, wherein the ends of the latching element (4) extending transversely in the axial direction thereof are hemispherical.

5. A tool bit chuck, as set forth in claim 4, wherein at least two latching elements (4) are provided.

6. A tool bit chuck, as set forth in claim 5, wherein three latching elements are provided.

* * * * *